United States Patent [19]

Traylor, Jr.

[11] 4,082,874
[45] Apr. 4, 1978

[54] CARPETING AND METHOD AND APPARATUS FOR MAKING CARPETING

[75] Inventor: Fling Armstrong Traylor, Jr., Hacienda Heights, Calif.

[73] Assignee: El-Do, Inc., Los Angeles, Calif.

[21] Appl. No.: 777,128

[22] Filed: Mar. 14, 1977

[51] Int. Cl.² .............................................. B65D 71/00
[52] U.S. Cl. ........................................ 428/54; 156/94; 156/302; 156/552; 428/47; 428/48; 428/52; 428/53; 428/55; 428/56; 428/58; 428/62; 428/85; 428/95; 428/97; 428/492; 428/493
[58] Field of Search .................. 428/2, 47, 48, 52, 53, 428/54, 55, 56, 58, 62, 85, 95, 97, 492, 493; 156/94, 302, 552

[56] References Cited

U.S. PATENT DOCUMENTS 3,352,733  11/1967  Kruce ..................................... 156/94
4,012,544  3/1977   Richards ............................... 428/95

Primary Examiner—Marion E. McCamish
Attorney, Agent, or Firm—Patrick F. Bright

[57] ABSTRACT

Carpeting especially suitable for use in areas subjected to heavy wear or abrasive weather includes a plurality of cured, rubber-based strips with filaments embedded in and projecting upwardly from them forming a pile on their upper surfaces. The strips lie side-to-side, and each is bonded along its bottom surface only to a vulcanized, rubber-based sheet that does not project substantially into the spaces between the elements. Apparatus and a method for making the carpeting are also disclosed.

28 Claims, 6 Drawing Figures

U.S. Patent     April 4, 1978     4,082,874
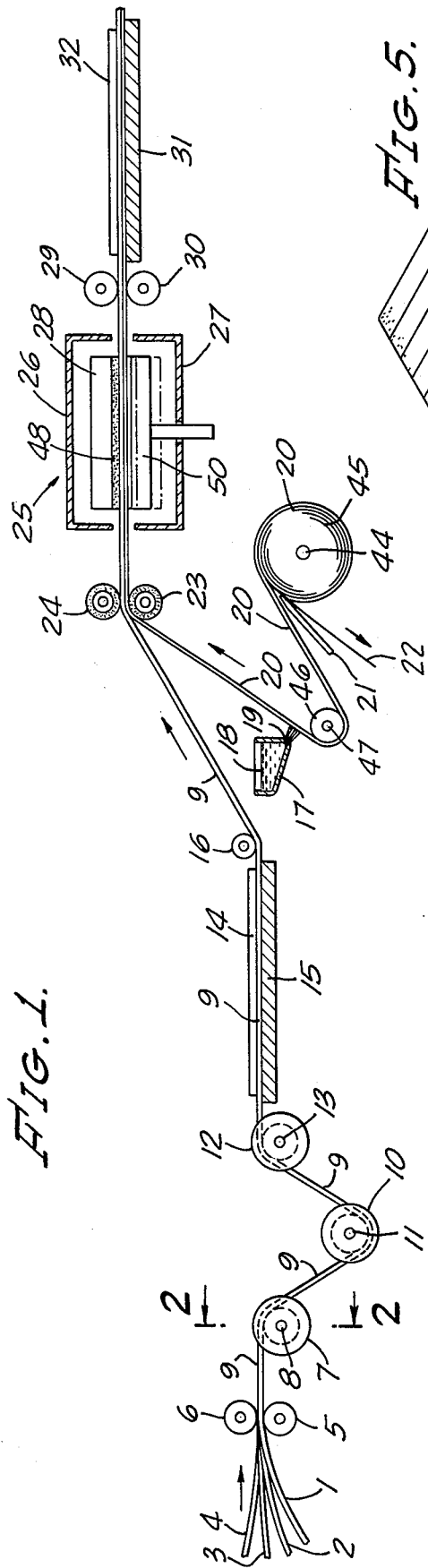
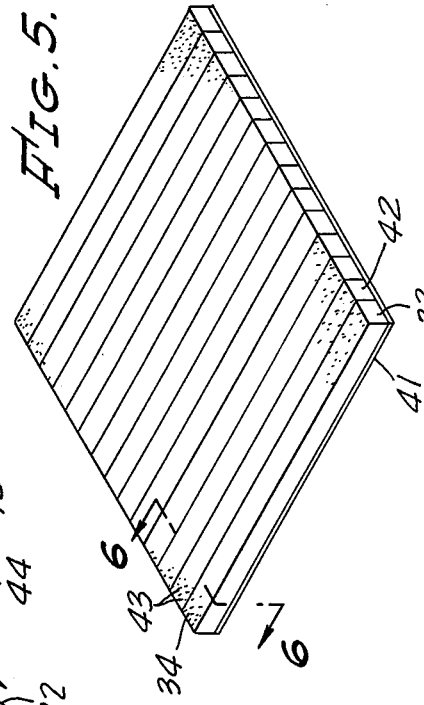
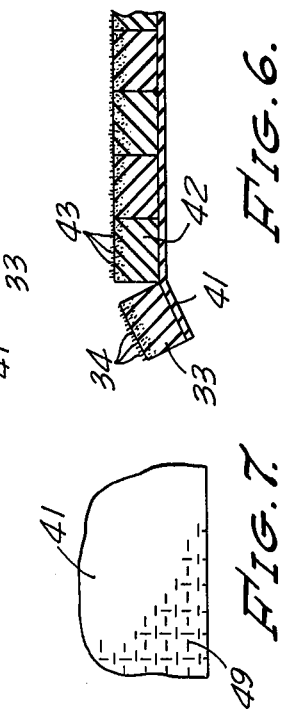
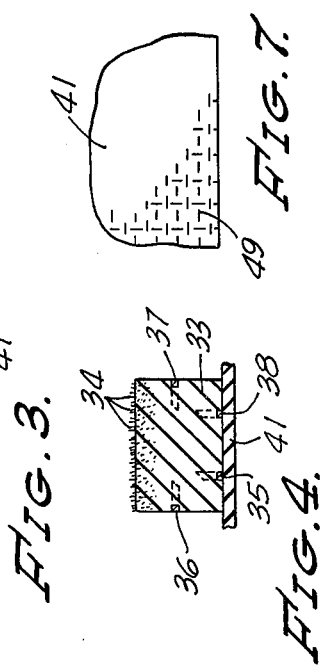
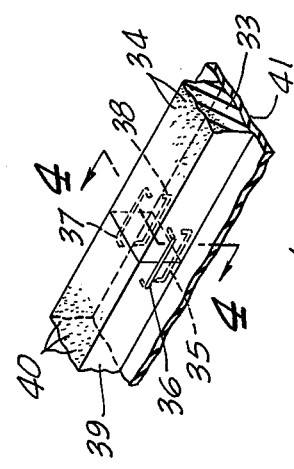
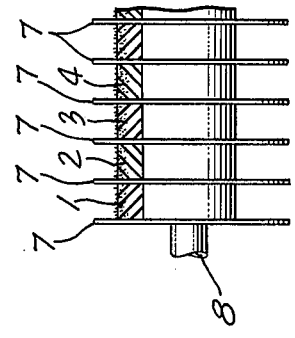

CARPETING AND METHOD AND APPARATUS FOR MAKING CARPETING

The invention relates to durable carpeting, and to apparatus and a method for making such durable carpeting. In particular, the durable carpeting may be made from rubber strips cut from the carcasses of discarded tires that have filamentary material embedded therein.

This invention provides carpeting that includes a plurality of cured, rubber-based elements or strips arrayed in side-to-side relationship. These elements include embedded filaments that project upwardly from the upper surface of the elements, thus forming a pile on that surface. Each of the cured, rubber-based elements is bonded by vulcanization to the surface of a vulcanized, rubber-based sheet. The bonding is effected only between the bottom surface of each cured, rubber-based element and the surface of the rubber-based sheet. Because the sheet is relatively thin, little or no rubber therefrom projects into the gaps between the strips or elements. The strips or elements therefore lie closely together, and are preferably contiguous. In the preferred embodiment, the other surface of the rubber-based sheet has a plurality of dimples or stipples to facilitate adhesive attachment of the carpeting to a surface. These dimples also permit moisture and air to pass between the carpeting and the surfaces on which the carpeting is laid.

The cured, rubber-based strips or elements may be derived from conventional tire casings, which are made of rubber, or a rubber substitute, and which have embedded filamentary material in the rubber. This filamentary material may be cotton, nylon, rayon, or other textile materials. The strips or elements may be made by cutting tire casing circularly or spirally, and removing an outer portion of the rubber matrix to expose a portion of the filamentary material. The strips or elements typically have a square or rectangular cross section. The width of these strips may be in the range of $\frac{1}{4}$ inch to about $\frac{3}{4}$ inch in some embodiments; the height, in the range of about $\frac{1}{4}$ to about $\frac{3}{4}$ inch.

The filamentary material projecting from the upper surface of the elements is made pile-like by brushing the projecting filaments in a direction parallel to the longitudinal axis of the elements. Transverse brushing, as is done in making previously known carpeting made from such elements, cuts away the rubber in the elements.

Preferably, the bottom surface of each element also has filamentary material projecting therefrom. These filaments need not be, and preferably are not, brushed into a pile-like finish. Rather, they are more akin to whisker stubble that penetrates into the rubber of the unvulcanized rubber sheet surface. In one embodiment, such whiskers are formed by a shearing action on the bottom surface of the elements. Thus, in making the elements from tires, strips are formed that have pile projecting from opposite sides and that are about twice as wide as the cured, rubber-based elements to be produced. These strips are cut by rotary, disk-shaped shearing cutters about mid-way between the pile-covered sides to form two cured, rubber-based elements with whiskers projecting from their bottom surface.

The length of elements made from tire casings may be in the range of about 4 or 5 feet to about 20 or more feet, depending upon how the strips are cut from such casings. Such strips or elements may be joined end-to-end by means of one or more staples bridging the bottom surfaces of the ends to be joined, one side of each of the ends to be joined, both sides of the ends to be joined, or both the bottom surfaces and one or both sides of the ends of the strips to be joined. Such staples may be made of metals or non-metals, but are preferably made from brass and retained in the finished carpeting. Brass is particularly good because it wears at approximately the same rate as the cured rubber in the elements itselves.

The cured, rubber-based elements in the new carpeting are bonded by vulcanization to the surface of a vulcanized, rubber-based sheet. Before vulcanizing, the unvulcanized rubber-based sheet may have a thickness such that, upon bonding to the bottom of each element in a vulcanizing process, little or no rubber from the rubber-based sheet intrudes into the spaces between the cured, rubber-based elements. In the preferred embodiments, this thickness is in the range of about 0.0025 inch to about 0.0035 inch.

These sheets may be, and preferably are, made of a plurality of plies including at least one fabric ply and one ply of rubber or masterbatched rubber. The fabric ply may be cotton, rayon, polyester or other natural or synthetic fiber. In the preferred embodiment, the fabric is a square-woven cotton sheeting having 48 by 56 threads per inch or 48 by 48 threads per inch.

Calendared over one side of such sheeting is rubber stock, preferably made from masterbatched rubber. In the preferred embodiment, masterbatched rubber is a synthetic styrene/butadiene rubber comprising 23.5% styrene and 76.5% butadiene. One hundred parts of this SBR is masterbatched with 82.5 parts of carbon black and 62.5 parts of oil, and then calendared onto the cotton sheeting. The masterbatch also includes such additives as curatives, antioxidants, accelerators, and activators such as zinc oxide. Other kinds of rubber, and other masterbatch formulations may be used provided the rubber-based sheet has an appropriate thickness and is vulcanizable.

Although the cured, rubber-based elements or strips can be bonded to the rubber-based sheet simply by pressing such elements to the unvulcanized rubber sheet, and then curing the carpet-like product that results, the bonding may be greatly improved by using vulcanizable rubber bonding agent. That bonding agent may be applied to the surface of the unvulcanized, vulcanizable rubber-based sheet before the sheet is pressed to the bottom surface of the cured, rubber-based elements. Such a vulcanizable rubber bonding agent is AMF/Voit's Orbibond, which is a mixture comprising 11% resin-based curing bonding agent solids, and about 89% hydrocarbon solvent having 8% to 9% aromaticity. Typical solvents in this mixture are Shell Oil Company's Thinner A and Chevron's Chevron 200, both of which have boiling ranges of about 165° F. to about 220° F. The precise nature of the resin-based curing solids in Orbibond is not known, and AMF/Voit treats the nature of this substance as proprietary.

The method of making the new carpeting comprises aligning a plurality of the cured, rubber-based elements or strips described above in side-to-side relationship, then pressing the bottom surface of each of the elements in the plurality to the surface of an unvulcanized, vulcanizable rubber-based sheet, described above, while maintaining the plurality of cured, rubber-based elements in side-to-side relationship. Then the resulting carpet-like product is cured until the cured, rubber-based elements are bonded by vulcanization to the rubber-based sheet, and the rubber-based sheet is itself vulcanized. In the preferred embodiment, stipples or dimples are formed in the surface of the rubber-based sheet opposite the surface to which the elements are bonded.

Where the strips or elements have a square or rectangular cross-section, the aligning is effected by bringing a plurality of the strips or elements into side-to-side relationship with one another, and with the filamentary material embedded in the strips or elements projecting upwardly from each. Preferably, the sides of the elements will be contiguous with one another, or nearly so.

After the elements have been aligned in side-to-side relationship, the pressing step is effected by pressing the bottom surface of each element in the array to the surface of an unvulcanized, vulcanizable rubber-based sheet. Preferably, the pressure effected in this step is in the range of about 55 pounds per square inch to about 65 pounds per square inch, more preferably, in the range of about 60 pounds per square inch to about 65 pounds per square inch. In the preferred embodiment, a vulcanizable rubber bonding agent is applied to the rubber-based sheet surface, to the bottom surface of each of the elements arrayed in side-to-side relationship, or both, after the elements have been aligned with one another, and before the elements are pressed to the surface of the rubber-based sheet. Such vulcanizable bonding agents are described above. The quantity of vulcanizable rubber bonding agent to be applied need not exceed the quantity required to provide a thin coating, such as in the range of about 0.0005 to about 0.0010 inch on the surface of the rubber-based sheet to be pressed to the array of elements, or on the bottom surface of the elements themselves, or both. Excessive amounts of bonding agent are undesirable, but the precise amount to be used can readily be determined.

In the preferred embodiment, curing is effected using both elevated temperatures and pressures for a time sufficient to effect relatively complete curing of the rubber-based sheet, and, where present, the vulcanizable rubber bonding agent. Thus, the vulcanization temperature may be in the range of about 290° F. to about 325° F., preferably about 310° F., and the curing pressure may be in the range of about 50 pounds per square inch gauge to about 90 pounds per square inch gauge, and preferably about 80 psig. The time required to effect curing is dependent in part upon whether or not vulcanizable rubber bonding agent is used, the nature of the vulcanizable bonding agent, the nature of the rubber-based sheet, the nature of the rubber in the elements, and the temperature and pressure at which curing is effected. However, where the temperatures and pressures of curing are in the ranges set forth here, the time required may range from about 2 minutes to about 7 minutes, preferably about 3 minutes.

The apparatus useful in producing the carpeting of this invention includes a source of cured, rubber-based elements having filamentary material embedded therein, means for aligning a plurality of such elements in side-to-side relationship, means for pressing the bottom surface of each of the elements in the plurality to an unvulcanized, vulcanizable rubber-based sheet while maintaining the plurality in side-to-side relationship, and means for curing the resulting carpet-like product until each cured, rubber-based element is bonded by vulcanization to the rubber-based sheet, and the rubber in the rubber-based sheet is itself vulcanized.

Where a vulcanizable rubber bonding agent is used to improve bonding, means are also provided for applying such bonding agent to the surface of the rubber-based sheet, to the bottom surface of each of the elements, or to both the surface of the rubber-based sheet and to the bottom surfaces of each of the elements to be bonded to that sheet. As the description of the preferred embodiments indicates, the apparatus may also include means for applying heat, means for applying pressure, or both, during the curing step; may include means for forming stipples or dimples in the surface of the rubber-based sheet that is opposite the elements; and may also include means for cutting the finished product longitudinally, transversely, or both to form tile-like products of countless different widths and lengths.

A more complete understanding of the inventions may be derived from the drawings, in which:

FIG. 1 is a diagram of the process and apparatus for making carpeting;

FIG. 2 is a sectional view taken along lines 2—2 of FIG. 1, showing means for aligning the elements in side-to-side relationship with one another;

FIG. 3 shows a pair of cured, rubber-based elements joined end-to-end;

FIG. 4 is a sectional view taken along lines 4—4 of FIG. 3, showing in greater detail the placement of fastening means between the elements joined end-to-end as shown in FIG. 3;

FIG. 5 shows the new carpeting made in accordance with the new method and apparatus;

FIG. 6 is a sectional view, taken along lines 6—6 of FIG. 5, showing the flexibility of the finished product; and FIG. 7 shows the stippled surface of the rubber-based sheet on the side opposite the cured, rubber-based strips.

Referring now to FIG. 1, a plurality of cured, rubber-based elements 1, 2, 3 and 4 are drawn from a source (not shown) by driven roller 5 cooperating with idler roller 6 toward aligning means 7, which are relatively flat disks, rotatably mounted on axle 8. As FIG. 2 shows, each of the cured, rubber-based elements 1, 2, 3 and 4 passes between two such disks 7 to form and maintain an array of these elements in side-to-side relationship. The array 9 then passes beneath a similar set of disks 10 mounted on axle 11, and over a similar series of disks 12 mounted on axle 13. The array then passes onto table-like surface 15 having a pair of slightly converging, L-shaped guildes 14 (only one is shown in FIG. 1) to bring the plurality of cured, rubber-based elements into side-to-side relationship. The plurality of elements then passes beneath idler roller 16 and upwardly to pressure rollers 23 and 24.

Simultaneously, rubber-based sheet 20 having protective sheeting 22 thereon, is drawn from roll 45 mounted on axle 44 past dividing means 21 which peels off sheeting 22. The rubber-based sheet then passes over roller 46 mounted on axle 47, and turns upwardly to join with array 9 between pressure rollers 23 and 24. Just after rubber-based sheet 20 passes over roller 46, vulcanizable rubber bonding agent 18 held in container 17 passes through opening 19 and is applied across the entire surface of the sheet that is to be joined to the base of each cured, rubber-based element. In one embodiment, the rubber-based bonding agent consists of solids dissolved in relatively volatile solvent, and that solvent evaporates substantially completely while sheet 20 passes from the bonding agent application point to the nip of rollers 23 and 24. Just before rubber-based sheet 20, coated with the dry, vulcanizable rubber bonding agent, enters the nip between rollers 23 and 24, the bonding agent-coated surface thereof joins to the base of the plurality of cured, rubber-based elements, and the pressure of the nip between rollers 23 and 24 joins the base of each element firmly to the bonding agent-coated surface of the rubber-based sheet.

The carpet-like product emerging from the right of rollers 23 and 24 then enters curing means 25, which here includes shields 26 and 27 and reciprocating heat- and pressure-applying means 28 and 50.

In curing means 25, the uncured, vulcanizable rubber-based sheet is itself cured, and the bottom surface of each of the elements arrayed in side-to-side relationship is bonded by vulcanization to the surface of the rubber-based sheet by application of sufficient heat and pressure for the necessary time. Heat and pressure are applied by movable platen 50, beneath which are heating elements that deliver sufficient heat to effect vulcanization. The upper surface of platen 50 carries a Teflon-coated fiberglass sheeting to produce a stippled effect in the bottom surface of the vulcanized rubber-based sheet. The lower surface of fixed platen 48 is covered with a rubber sheet to accommodate the varying dimensions of the rubber-based elements. Thereafter, pressure means 50 is moved downwardly away from the cured product, the product is drawn from curing means 25 by driven roller 30 cooperating with driving roller 29, and onto surface 31 which is bounded by L-shaped confining means 32 on both sides of the finished product. After cooling, the produce may be cut by slitting the product longitudinally, transversely, or both to form tiles of desired width and length.

FIGS. 5 and 6 show the finished product. In FIG. 5, the tile includes a plurality of cured, rubber-based elements 33, having filamentary material embedded in and projecting upwardly from the upper surface thereof. Each element is bonded securely along its bottom surface only to vulcanized, rubber-based sheet 41, as FIG. 6 shows. Thus, the side of element 33 may be flexed away from the side of element 24. Yet, when tiles are laid edge-to-edge, the elements of each are virtually contiguous to one another. These cured, rubber-based elements are much more strongly bonded to the rubber-based sheet than are the similar elements glued to the base of the carpeting shown in U.S. Pat. No. 3,352,733.

FIGS. 3 and 4 show a pair of cured, rubber-based elements 33 and 39 having filamentary material 34 and 40, respectively, embedded in each and projecting upwardly from the top of the two elements. These elements are joined end-to-end by staples 35 and 38 bridging the bottom surfaces of the two elements, each staple having the portion between its prongs lying flush with the bottom surface of each element, or, more preferably, penetrating slightly into that surface. Similarly, staples 36 and 37 are driven into the sides of each of the elements and bridge the gap between them. FIG. 4 shows that staples 35 and 38 remain in the product, between the upper surface of the rubber-based sheet and lower surface of the cured, rubber-based element having filamentary material 34 embedded therein.

FIG. 7 shows the stippled pattern formed in the surface of rubber-based sheet 41 opposite the side to which the cured, rubber-based elements are attached. In this embodiment, stipples 49 are arrayed in a kind of cross-hatch pattern, but other embodiments are practicable.

EXAMPLE

Tests were performed to compare the tensile strength and delamination strength of the carpeting of this invention to the carpeting made in accordance with the teachings of U.S. Pat. No. 3,352,733 (hereafter 733 carpeting).

Specimens of each carpeting measuring 30 millimeters long and 150 millimeters wide were made for testing in a tension test machine called the Tensilon. The Tensilon has two gripping members called chucks spaced a distance of 100 millimeters apart. Each specimen was separately tested by fastening the first side of the specimen in one chuck, and the other side of the specimen in the other chuck. Each chuck then gripped the cured, rubber-based elements along their length. The two chucks were then pulled apart at a rate of 200 millimeters per minute until the test specimen broke. Maximum strength at this point was measured. Three separate samples of each carpeting type were tested, and the following results obtained:

| TENSION TEST RESULTS | | |
|---|---|---|
| | Tensile Strength (Kg/3 cm) | |
| Run No. | Carpeting of the Invention | 733 Carpeting |
| 1 | 35.7 | 10.6 |
| 2 | 30.3 | 15.9 |
| 3 | 31.8 | 18.1 |
| Average | 32.6 | 14.9 |

Specimens of the carpeting of the invention and of the 733 carpeting were cut into test pieces 30 millimeters wide and 170 millimeters long. In each sample, a cut parallel to and 20 millimeters from one end was made transversely through the cured, rubber-based elements down to, but not through, the vulcanized, rubber-based sheet below. Then the base cloth and rubber strips in front of the cut were peeled back a distance of 4 to 5 centimeters. Each test sample was installed in a jig set up so that the rubber-based, vulcanized sheet could be peeled from the cured, rubber-based elements until a right angle was formed between them. The 90° delamination strength was measured at a peeling speed of 200 millimeters per minute using a Choper tension test machine. Three samples of each type of carpeting were tested with the following results:

| DELAMINATION STRENGTH RESULTS | | |
|---|---|---|
| | Tensile Strength (Kg/3 cm) | |
| Run No. | Carpeting of the Invention | 733 Carpeting |
| 1 | 10.0 | — |
| 2 | 10.9 | — |
| 3 | 11.2 | — |
| Average | 10.7 | — |

As these tests show, the 733 carpeting has virtually no delamination strength, and has significantly poorer tensile strength than the carpeting of the invention. The carpeting of the invention clearly is better able to withstand the shearing forces imposed by those walking or moving heavy objects over the surface of the carpet.

What is claimed is:

1. Carpeting comprising a plurality of cured, rubber-based elements arrayed in side-to-side relationship and having filaments embedded therein, said filaments projecting upwardly from, and forming a pile on, the surface of said elements, each cured, rubber-based element being bonded by vulcanization along its bottom surface to the surface of a vulcanized, rubber-based sheet.

2. The carpeting of claim 1 wherein said cured, rubber-based elements are joined end-to-end by at least one staple bridging the bottom surfaces of the ends so joined.

3. The carpeting of claim 1 wherein said cured, rubber-based elements are joined end-to-end by at least one staple bridging at least one side of the elements so joined.

4. The carpeting of claim 3 wherein staples bridge both sides of the elements so joined.

5. The carpeting of claim 2 wherein said cured, rubber-based elements are also joined end-to-end by at least one staple bridging at least one side of the elements so joined.

6. The carpeting of claim 1 wherein the unbonded surface of said vulcanized rubber-based sheet includes a plurality of stipples.

7. The carpeting of claim 1 wherein filamentary material embedded in and projecting from the bottom surface of said elements penetrates into the surface of said vulcanized, rubber-based sheet bonded by vulcanization to said elements.

8. The carpeting of claim 1 wherein the cured, rubber-based elements are derived from tire casings.

9. The carpeting of claim 1 wherein said filaments are made of at least one substance selected from the group consisting of rayon, nylon, and polyester.

10. The carpeting of claim 1 wherein each cured, rubber-based element is also bonded to the vulcanized rubber-based sheet at least partially by vulcanized rubber bonding agent.

11. The carpeting of claim 1 wherein the rubber-based sheet has, before vulcanizing, a thickness in the range of about 0.0025 to about 0.0035 inch.

12. The carpeting of claim 1 wherein said rubber-based sheet includes a fabric ply and vulcanized rubber stock thereover.

13. The carpeting of claim 12 wherein the fabric ply has a vulcanized rubber stock over both sides.

14. The carpeting of claim 13 wherein the vulcanized rubber stock is a styrene/butadiene rubber.

15. A method comprising aligning in side-to-side relationship a pluarlity of cured, rubber-based elements having filaments embedded therein, said filaments projecting upwardly from, and forming a pile on the surface of said elements, pressing the bottom surface of each of said plurality of elements to an unvulcanized, vulcanizable rubber-based sheet while maintaining said plurality of elements in side-to-side relationship, and curing the resulting carpetlike product until each cured, rubber-based element is bonded by vulcanization to said rubber-based sheet, and said rubber-based sheet is itself vulcanized.

16. The method of claim 15 wherein the vulcanizable rubber bonding agent is applied to said rubber-based sheet before said pressing takes place.

17. The method of claim 16 wherein vulcanizable rubber cement is applied to the bottom surface of each of said cured, rubber-based elements before said pressing takes place.

18. The method of claim 15 wherein a plurality of stipples are formed in the bottom surface of said rubber-based sheet during said curing.

19. An apparatus comprising a source of a plurality of cured, rubber-based elements having filaments embedded therein, said filaments projecting upwardly from, and forming a pile on the surface of said elements, means for aligning said plurality in side-to-side relationship, means for pressing the bottom surface of each of said plurality of cured, rubber-based elements to an unvulcanized, vulcanizable rubber-based sheet while maintaining said plurality in side-to-side relationship, and means for curing the resulting carpetlike product until each cured, rubber-based element is bonded by vulcanization along its bottom surface to said rubber-based sheet and said sheet is itself vulcanized.

20. The apparatus of claim 19 further including means for applying vulcanizable rubber bonding agent to said rubber-based sheet before said pressing takes place.

21. The apparatus of claim 19 including means for applying vulcanizable rubber bonding agent to the bottom surface of each of said pluarlity of cured, rubber-based elements before said pressing takes place.

22. The apparatus of claim 19 further including means for slicing said carpeting longitudinally between selected cured, rubber-based elements to form a plurality of narrower strips.

23. The apparatus of claim 19 further comprising means for cutting said carpetlike product transversely to form a plurality of tiles.

24. The apparatus of claim 19 further comprising means for producing a plurality of stipples in the bottom surface of said rubber-based sheet.

25. Carpeting comprising a plurality of contiguously arrayed cured, rubber-based elements having filaments embedded therein, said filaments projecting upwardly from, and forming a pile on, the surface of said elements, said elements being unbonded along their contiguous surfaces, each cured, rubber-based element being bonded by vulcanization along its bottom surface to the surface of a vulcanized, rubber-based sheet with substantially no rubber from said rubber-based sheet projecting between the contiguous sides of said cured, rubber-based elements.

26. Carpeting comprising a plurality of contiguously arrayed, cured, rubber-based elements having filaments embedded therein, said filaments projecting upwardly from the upper surface and downwardly from the bottom surface of said cured, rubber-based elements, said upwardly projecting filaments forming a pile on the upper surface of said cured, rubber-based elements, each cured, rubber-based element being bonded by vulcanization along its bottom surface to the surface of a vulcanized, rubber-based sheet with said filamentary material projecting from the bottom surface of said cured, rubber-based elements penetrating into the surface of said vulcanized, rubber-based sheet.

27. Carpeting comprising a plurality of contiguously arrayed, cured, rubber-based elements having filaments embedded therein, said filaments projecting upwardly from the upper surface and downwardly from the bottom surface of said cured, rubber-based elements, said upwardly projecting filaments forming a pile on the upper surface of said cured, rubber-based elements, each cured, rubber-based element being bonded by vulcanization and at least partially by vulcanized rubber bonding agent along its bottom surface to the surface of a vulcanized, rubber-based sheet with said filaments projecting from the bottom surface of said cured, rubber-based elements penetrating into the surface of said vulcanized, rubber-based sheet.

28. Carpeting comprising a plurality of cured, rubber-based elements arrayed in side-to-side relationship and having filaments embedded therein, with some of said filaments projecting upwardly from, and forming a pile on, the upper surface of said elements, and each cured, rubber-based element being bonded by vulcanization along its bottom surface to the surface of a vulcanized, rubber-based sheet with substantially no rubber from the rubber-based sheet projecting between the sides of the rubber-based elements and with some of said filaments projecting downwardly from the bottom surface of the cured, rubber-based elements and penetrating into the surface of said vulcanized, rubber-based sheet.

* * * * *